United States Patent [19]

Leff et al.

[11] Patent Number: 4,915,632

[45] Date of Patent: Apr. 10, 1990

[54] COMMUNICATION AID WITH SEQUENTIAL LIGHTING

[76] Inventors: Ruth B. Leff; Aaron N. Leff, both of 6589 N. Crestwood Dr., Milwaukee, Wis. 53209

[21] Appl. No.: 342,490

[22] Filed: Apr. 24, 1989

[51] Int. Cl.4 .......................... G09B 5/00; G09B 19/00
[52] U.S. Cl. .................................................. 434/112
[58] Field of Search ............... 434/112, 159, 169, 176, 434/184

[56] References Cited

U.S. PATENT DOCUMENTS 3,651,512 3/1972 Summers ......................... 434/112 X
4,406,998 9/1983 Willough ......................... 434/112 X Primary Examiner—William H. Grieb
Attorney, Agent, or Firm—Andrus, Sceales, Starke & Sawall

[57] ABSTRACT

A communication aid comprising a housing and a series of visual display cards bearing illustrations of objects are mounted in side-by-side relation on the front face of the housing. A group of lights are also disposed on the front face, each light being associated with a card. A group of physical objects corresponding to the objects depicted on the cards can also be positioned on a horizontal shelf on the housing directly above the corresponding card and light. The lights are connected in electrical circuit that is arranged so that each light is illuminated in sequential progression. A membrane-type switch is connected in the circuit and is located remotely of the housing. Through manual operation of the switch, the light progression is stopped at the selected card and/or object that expresses the student's answer or need. When the light progression is stopped, the selected light will blink repeatedly. By reactuating the switch, the light progression is re-established.

9 Claims, 2 Drawing Sheets

COMMUNICATION AID WITH SEQUENTIAL LIGHTING

BACKGROUND OF THE INVENTION

Various types of communication or educational aids have been proposed as learning tools for children or retarded or physically disabled individuals. A communication aid may take the form of the identification of objects, a comparison of size or shapes, the identification of letters or words, a comparison of likes or opposites, or teaching of left-right directionality.

With small children or a handicapped person, it is helpful to initially begin the learning process with physical objects and then proceed to pictures or words.

One type of communication aid is described in U.S. Pat. No. 4,465,465. The communication aid of that patent includes a housing or console and a group of large pressure operated switches are mounted on an inclined front surface of the console and a series of cards which bear pictures of objects are located directly above each switch. By actuating one of the switches, an audio message is played which corresponds to the object on the card and a light associated with the card is also illuminated.

Another type of communication aid, as used in the past, has consisted of a housing having a top surface adapted to support a series of commonly recognized physical objects. The housing also includes a front surface and a group of cards bearing pictures or illustrations are mounted on the housing in alignment with one of the objects on the top supporting surface. In normal use each picture would be an illustration of the physical object located above the respective picture. A switch is mounted in alignment with each picture and physical object and each switch is connected through an electrical circuit to a light and an audible signal, such as a horn or buzzer. With this type of communication aid, the teacher will ask the student a question dealing with the objects and pictures and the student will answer or respond by pushing one of the switch buttons, thus illuminating the light and sounding the audible signal associated with that object.

SUMMARY OF THE INVENTION

The invention is directed to a communication aid that can be used as a basic learning tool. The aid includes a housing and a series of visual display cards, each bearing a picture or illustration of an object, are mounted in side-by-side relation on the front face of the housing. The pictures may illustrate commonly known items or needs, such as, for example, a clock, eye glasses, pencil, glass of water, etc.

A series of lights are located on the front face of the housing with each light being associated with one of the cards. In addition, a series of physical objects corresponding to the objects depicted on the cards can be positioned on a horizontal shelf of the housing directly above the corresponding card.

The lights are connected in an electrical circuit that is arranged so that each light is illuminated in sequential progression. A membrane-type switch is connected in the electrical circuit and is located remotely of the housing. By manually actuating the switch the light progression is stopped at the selected card and/or object that expresses the students need or answer. When the light progression is stopped, the selected light will blink repeatedly. By again actuating the switch, the light progression can be reestablished.

The device of the invention has particular use with non-verbal patients with severe physical limitations and can also be used as a learning tool for the physical handicapped or children. More particularly, the device can be used to communicate the needs of a non-verbal patient. For example, different foods can be depicted on the visual display cards and the patient can then select the food which satisfies his or her need.

The communication aid can also be used to administer language tests as, for example, the Peabody Picture Vocabulary Test.

The aid can also be employed to identify pictures and objects and train language skills. In addition, the aid can be employed to improve visual tracking from left-to-right and as a speed drill for articulation carryover.

The actuating switch is located remotely from the housing and includes a large pressure pad that can be actuated by a person's hand, foot, elbow, or other body part, so that the device can be operated by patients having severe physical limitations.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
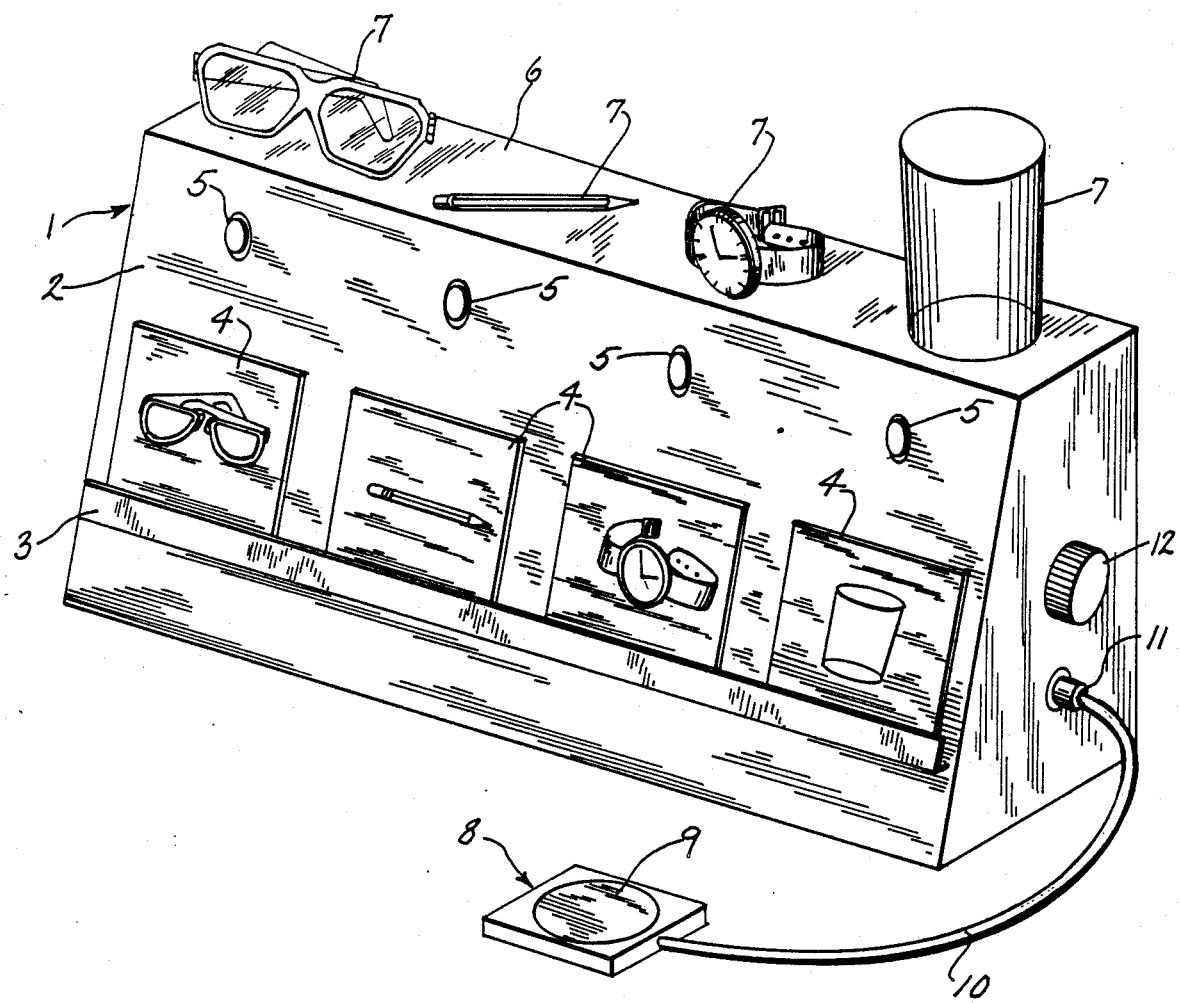
FIG. 1 is a perspective view of the communication aid of the invention.

FIG. 1 illustrates the communication aid of the invention which includes a housing or console 1 having a front face 2 that is inclined slightly to the vertical. A generally L-shaped guide rail 3 is mounted on the lower portion of front face 2 and supports a series of cards 4 which bear pictures or illustrations of physical objects. As shown in FIG. 1, four cards 4 are illustrated with the cards bearing pictures of a pencil, eye glasses, a watch, and a water glass.

Located above each of the cards 4 is a light 5, and the lights can either be the same color, or preferably can be different colors.

The top surface of housing 1 defines a generally horizontal shelf 6 which, depending on the particular use of the communications aid, can support a group of physical objects 7 which correspond to the objects shown on the cards 4.

Lights 5 are illuminated in sequencial progression, as will be hereinafter described, and the progression is controlled by a manually operated switch 8 which is located remotely from housing 1. Switch 8 includes a relatively large pressure pad 9 which can be operated by a person's hand, or in the case of a patient having severe physical disabilities, the pressure pad can be operated by a person's foot, elbow, head, or other body part. Switch 8 is connected to housing 1 by a flexible electrical connection 10, terminating in a jack 11 which is plugged into the side surface of housing 1.

A speed adjusting knob 12 is also mounted on the side surface of housing 1 and through rotation of knob 12 the interval of the sequencing of illumination of lights 5 can be varied, as desired.

In use, a series of cards 4 are mounted on the guide rail 3 on front face 2 of housing 1 and a group of objects 7 corresponding to the objects depicted on cards 4 can also be positioned on shelf 6, depending on the particular use of the communication aid.

The patient or student, by depressing switch pad 9, will stop the light progression at the selected card and/or object that expresses the student's answer or need. When the light progression is stopped, the selected light will blink repeatedly. By again actuating the switch 8, the light progression will be reestablished.

Figure 2:
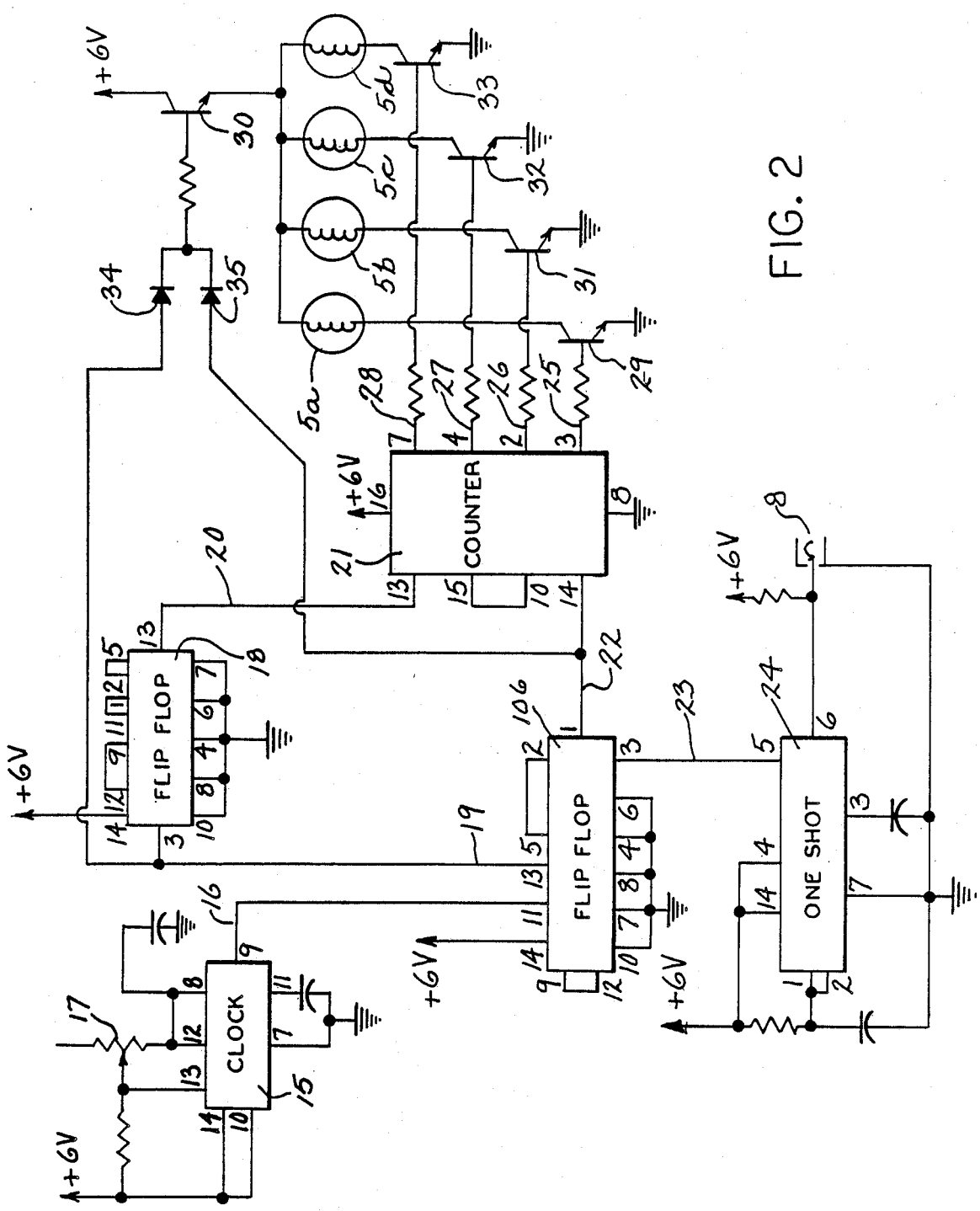
FIG. 2 is a schematic drawing of the electric circuit.

Referring to the circuit in FIG. 2, a clock 15 is provided by half of a 556 integrated circuit timer chip, where manufactured assigned pin number designations are shown for the integrated circuit chips in FIG. 2 for clarity. The frequency of the clock pulses on output 16 is varied by potentiometer 17, operably connected to knob 12, in known manner. The clock rate is divided by two in known manner by flip flop 18 provided by a CD4013 integrated circuit chip, which divided clock rate is divided by four by flip flop 18 provided by another CD4013 integrated circuit chip. The clock pulses on line 19 are one-half the frequency of the clock pulses on line 16. The clock pulses on line 20 are one-eighth the frequency of the clock pulses on line 16.

The clock pulses on line 20 increment a decade counter 21 provided by a CD4017 integrated circuit chip. Counter 21 is stopped and started by a signal on line 22 from flip flop 18 having a flip flop output function at pin 1 controlled by input pin 3 on line 23 from a monostable one shot multivibrator 24 provided by the other half of the noted 556 integrated circuit timer chip which in turn is activated by switch 8 operated by the user. Monostable one shot multivibrator 24 provides a debounce circuit in known manner by choosing a sufficient length output pulse, e.g. one second, such that the closing of mechanical switch 8 is not interpreted as several pulses or signals if there is any bounce of same at the bottom of its stroke. Once the one shot circuit 24 generates its output pulse on line 23, any further false triggerings or bounces from switch 8 are ignored until the end of the pulse on line 23, e.g. until the end of the one second interval. Each pulse on line 23 clocks the output of flip flop 18 on line 22 to its opposite state, such that a high state on line 22 enables counter 21, and a low state on line 22 disables counter 21. Thus, the user depresses switch 8, to enable counter 21, and depresses switch 8 again, to disable counter 21, and so on.

When counter 21 is enabled, it counts clock pulses on line 20, and increments to sequentially provide a high signal on output line 25, then line 26, then line 27, then line 28, and then repeats the cycle in sequence. That is, the clock pulses on line 20 increment counter 21, and when the number of clock pulses reaches a given count, line 25 goes high, and when the number of clock pulses reaches another higher given count, line 25 goes low and line 26 goes high, and when the number of clock pulses reaches another higher given count, line 26 goes low and line 27 goes high, and when the number of clock pulses reaches another higher given count, output 27 goes low and output 28 goes high, and when the number of clock pulses reaches another higher given count, output 28 goes low and output 25 goes high, and the cycle repeats.

A high signal on line 25 drives transistor 29 into conduction, which in turn completes a circuit through light or display 5a and transistor 30, if the latter is on, to thus actuate or energize display 5a to an on state. A high signal on line 26 drives transistor 31 into conduction, which completes a circuit through light or display 5b and transistor 30, if the latter is on, to thus actuate or energize display 5b to an on state. A high signal on line 27 drives transistor 32 into conduction, which completes a circuit through light or display 5c and transistor 30, if the latter is on, to thus actuate or energize display 5c to an on state. A high signal on line 28 drives transistor 33 into conduction, which completes a circuit through light or display 5d and transistor 30, if the latter is on, to thus actuate or energize display 5d to an on state. Lights 5a-5d are thus turned on and off in sequence.

Diodes 34 and 35 provide an OR gate for driving transistor 30. When counter 21 is enabled, the high state on line 22 is transmitted through diode 35 to drive transistor 30 into conduction. When counter 21 is disabled, the low state on line 22 will not turn on transistor 30. Instead, the clock pulses from line 19 through diode 34 turn transistor 30 on and off at the pulse rate on line 19, such that the respective light will flash on and off at such pulse rate, which is four times the pulse rate on line 20.

When counter 21 is disabled, it stops incrementing, and hence the output lines 25, 26, 27 and 28 stay at their then acquired state such that the light which is then in an on state will now be controlled by transistor 30. For example, assume counter 21 is incrementing, and assume pushbutton 8 is depressed. This causes a one shot output pulse on line 23 which in turn causes flip flop output line 22 to change states and transition low, which in turn disables counter 21. If for example output line 26 of counter 21 is high when the counter stops incrementing, then output line 26 will remain high, such that transistor 31 will be conductive and light 5b will be on when transistor 30 is conductive. Transistor 30 pulses on and off as controlled by line 19.

Thus, when the user stops the sequencing by depressing pushbutton 8, the particular light which is on at that time will now instead flash on and off at a rate substantially and discernibly higher than the sequence rate, which readily and quickly facilitates recognition thereof by the user. When pushbutton 8 is again depressed, the flashing stops, and sequencing resumes, and the lights turn on and off in serial sequence in response to incrementing of counter 21.

The communication aid of the invention can be used either as an education tool for use in identifying pictures and objects, administering language tests, or training language skills. The device can also be used with patients with severe physical limitations. In some usages, both the cards 4 and objects 7 are utilized, while in other modes of use only the cards or objects are employed.

In a mode of operation dealing with the identification of objects, the teacher may ask the student, "show me the one we eat", "show me the one we write with", etc. The student will then actuate the switch 8 to stop the light progression at the selected picture and/or object which best expresses the answer.

The device can also be employed as a speed drill for articulation carry-over. In this mode of operation, the objects and/or pictures are used with the same starting letter as, for example, "S". The student will then enunciate each word as it is lighted and the light progression can then be speeded up and the student will repeat the words at a faster rate. In this mode of operation, the switch 8 would not be utilized.

The communication aid can also be used in visual tracking for persons with visual problems or dyslexia, in which the student can work on left to right progression.

As a further usage, the communication aid can be used to administer language tests to non-verbal students.

The device can also be used by a non-verbal patient to express needs or desires. In this regard, a series of visual display cards 4 bearing certain basic needs such as, for example, a glass of water, television, toilet, etc. are inserted in the guide rack 3 of housing 1 and the patient by actuating the switch 8 can express his or her need or desire.

While the drawings show the cards 4 bearing pictures or illustrations, other objects or symbols, such as numbers, letters of the alphabet, etc., can be depicted on the cards.

Various modes of carrying out the invention are contemplated as being within the scope of the following claims particularly pointing out and distinctly claiming the subject matter which is regarded as the invention.

We claim:

1. A communication aid, comprising a supporting structure comprising a housing having a supporting surface, a plurality of physical objects mounted in spaced relation on the supporting surface, a plurality of lights, each light associated with one of said objects, power supply means for illuminating said lights in sequential progression, and manually operable switch means for terminating the sequential progression of lights and maintaining illumination of a single light of said plurality.

2. The communication aid of claim 1, and including means for intermittently illuminating said single light after termination of said sequential progression.

3. The communication aid of claim 1, wherein said supporting structure comprises a housing having a generally vertical face, said visual displays comprising display cards bearing illustrations of objects.

4. The communication aid of claim 1, and including means for adjusting the speed of the sequential progression.

5. The communication aid of claim 1, wherein said switch means is located remotely with respect to said supporting structure.

6. The communication aid of claim 5, wherein said switch means comprises a switch having a large push pad.

7. A communication aid comprising a housing having a first supporting surface and a second supporting surface, a plurality of cards mounted in sequence on said first surface, a light associated with each card, each card bearing an illustration of an object, a series of physical objects disposed on said second surface, each physical object being associated with one of said cards and the physical object being the same as the object depicted on the associated card, power supply means for illuminating said lights in sequential progression, manually operable switch means located remotely with respect to the housing for terminating the sequential progression of lights and maintaining the illumination of a single light, and means for intermittently illuminating said single light at the termination of said sequential progression.

8. The communication aid of claim 7, and including means for adjusting the speed of said sequential progression.

9. A communication aid comprising a supporting structure, a plurality of visual displays mounted in spaced relation on the supporting structure, said supporting structure including a generally vertical face and said visual displays comprising cards bearing illustrations of objects, said supporting structure also including a generally horizontal surface and said visual displays further including physical objects disposed on said horizontal surface with said physical objects being the same as the objects depicted on said cards, a plurality of lights, each light associated with one of said visual displays, power supply means for illuminating said lights in sequential progression, and manually operable switch means for terminating the sequential progression of lights and maintaining illumination of a single light of said plurality.

* * * * *